United States Patent [19]
Elder et al.

[11] Patent Number: 5,488,413
[45] Date of Patent: Jan. 30, 1996

[54] CATV TELEPHONY SYSTEM USING SUBSPLIT BAND FOR BOTH DIRECTIONS OF TRANSMISSION

[75] Inventors: Joseph M. Elder, Boulder; Donald L. Bise, Parker; Terry D. Bolinger, Aurora; Peter Ruether, Longmont, all of Colo.

[73] Assignee: XEL Communications, Inc., Aurora, Colo.

[21] Appl. No.: 259,479

[22] Filed: Jun. 14, 1994

[51] Int. Cl.⁶ .................................................. H04N 7/173
[52] U.S. Cl. ................. 348/13; 348/12; 348/10; 455/5.1; 455/6.3
[58] Field of Search ............... 348/6, 8, 12, 13, 348/14, 15, 10, 7, 16, 17, 18; 455/3.1, 4.2, 5.1, 6.1, 4.1, 6.3; 370/69.1, 71, 73; H04N 7/173, 7/16, 7/14

[56] References Cited

U.S. PATENT DOCUMENTS

| | | |
|---|---|---|
| 3,943,447 | 3/1976 | Shomo . |
| 3,980,831 | 9/1976 | Mertel . |
| 4,454,538 | 6/1984 | Toriumi . |
| 4,633,462 | 12/1986 | Stifle et al. .................. 370/85 |
| 4,763,317 | 8/1988 | Lehman et al. . |
| 4,805,014 | 2/1989 | Sahara et al. . |
| 4,811,335 | 3/1989 | van Baardwijk et al. . |
| 4,891,694 | 1/1990 | Way ........................... 358/86 |
| 4,928,272 | 5/1990 | Ohue . |
| 5,029,333 | 7/1991 | Graves et al. . |
| 5,124,980 | 6/1992 | Maki . |
| 5,142,532 | 8/1992 | Adams ...................... 370/94.1 |
| 5,185,738 | 2/1993 | Kelly ....................... 370/95.1 |
| 5,189,673 | 2/1993 | Burton et al. . |
| 5,440,335 | 8/1995 | Beveridge ................... 348/13 |

Primary Examiner—James J. Groody
Assistant Examiner—Chris Grant
Attorney, Agent, or Firm—Dorr, Carson, Sloan & Birney

[57] ABSTRACT

A cable television (CATV) system is modified to provide two-way telephone communications in a subsplit band below the video signal, preferably in the range of approximately 5–40 MHz. Each line amplifier in the coaxial cable network is equipped with a bypass strap or bypass circuitry to maintain a signal path through the line amplifier for the telephone signal in the event of failure of the line amplifier. Due to the decreased attenuation resulting from its lower frequency, the telephone signal can typically travel the distance of three or four line amplifier spacings without amplification. Line amplifier failure is a common occurrence in CATV networks. Therefore, the present invention greatly increases the reliability of telephone communications over CATV networks.

22 Claims, 7 Drawing Sheets

CATV TELEPHONY SYSTEM USING SUBSPLIT BAND FOR BOTH DIRECTIONS OF TRANSMISSION

BACKGROUND OF THE INVENTION

1. Field of the Invention

The present invention relates generally to the field of cable television (CATV) systems. More specifically, the present invention discloses a system for providing full duplex telephone communications over a CATV network.

2. Statement of the Problem

Figure 1:
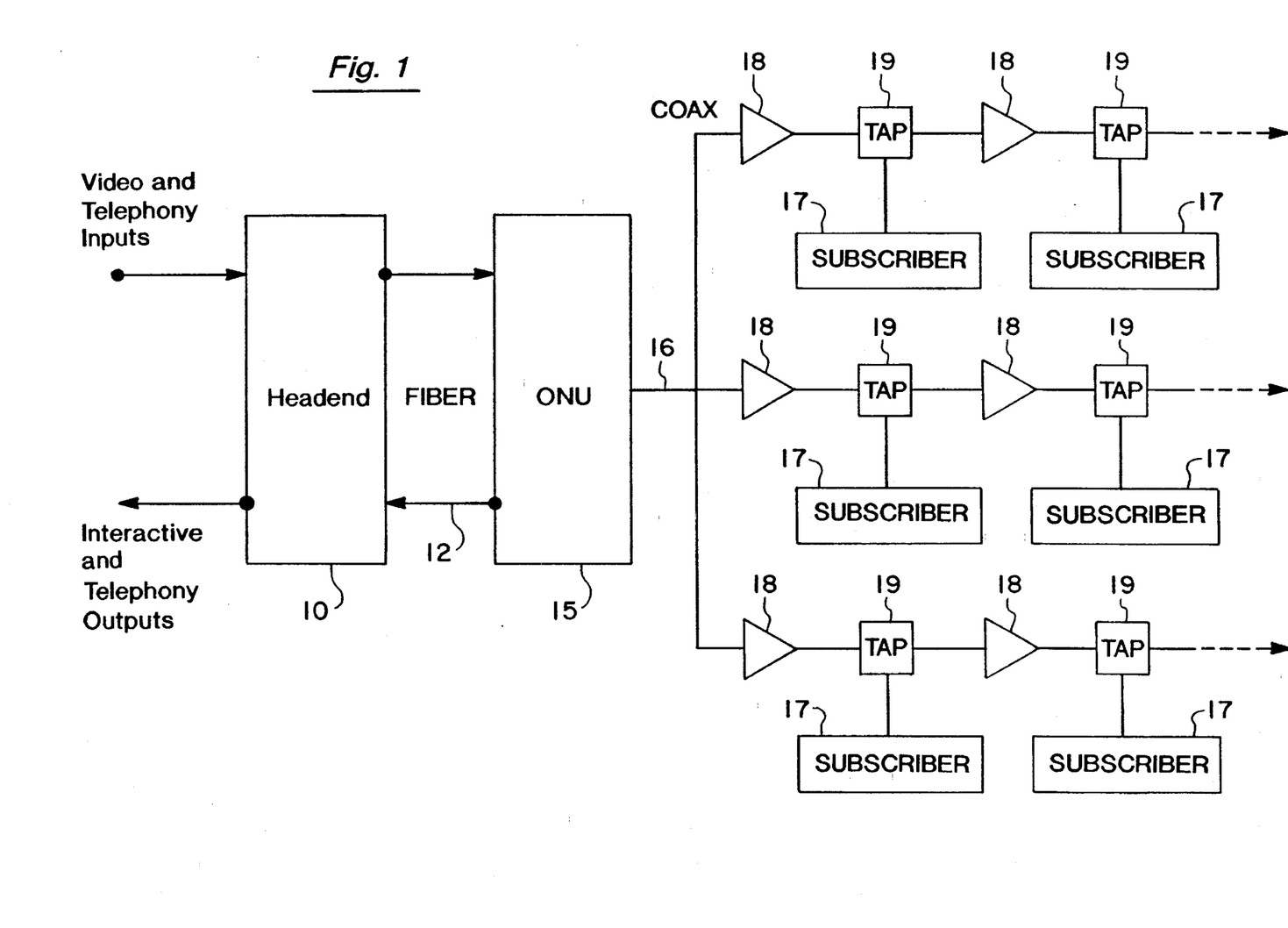
FIG. 1 is an overall block diagram of a conventional CATV system.

FIG. 1 shows an simplified overview of a typical CATV architecture as currently implemented. This is commonly referred to as a tree and branch structure. The headend 10, where programming signals originate, is connected by fiber optics 12 to a number of optical network units (ONU's) 15. At the ONU 15, the optical signal is converted to an electrical signal and sent down the distribution network using conventional coaxial cables 16. This cable is split into different paths for distribution to multiple routes with multiple subscriber units 17. If the branches become long enough, line amplifiers (also known as extenders) 18 are inserted at intervals in the coaxial cable network to boost the signal.

If telephone service is desired, the CATV architecture must provide a return path. To implement this return path, each line extender must be equipped with either an amplifier or a bypass strap in the return or upstream direction. Once the return signal reaches the ONU, a diplex filter splits the return signal off and routes it through a return fiber optic back to the headend. Presently, most CATV networks transmit signals in the forward or downstream direction at frequencies from approximately 50 to 600 MHz. The reverse or upstream direction is rarely used. However, when the upstream direction is used for upstream telephony and other interactive services, the frequency range is typically in the range of approximately 5 to 40 MHz.

The frequency range for telephony in the downstream direction is also an issue. Two alternatives have been suggested. The first alternative is to take one 6-MHz TV channel for downstream telephone communications. Many CATV system operators oppose this alternative because they are already shod of space for TV channels. The second alternative proposes to place downstream telephony in a frequency band above 600 MHz. One major disadvantage of this scheme is the fact that almost all existing line extenders would need to be replaced because their maximum bandwidth is approximately 600 Mhz.

Another major disadvantage of both alternatives is the fact that they are dependent on proper operation of the line extenders. The downstream telephony signal as well as the video signal are lost if a line extender fails. Line extender failure is a common occurrence in CATV networks. This question of reliability (as compared to the exceptional reliability that local telephone companies have historically enjoying using a copper-based network) is considered a major concern with consumers based on industry marketing surveys.

A number of systems have been invented in the past to provide telephony or other narrow-band communications over CATV networks, including the following:

| Inventor | Patent No. | Issue Date |
| --- | --- | --- |
| Shomo | 3,943,447 | March 9,1976 |
| Mertel | 3,980,831 | Sept. 14, 1976 |
| Toriumi | 4,454,538 | June 12, 1984 |
| Lehman et al. | 4,763,317 | Aug. 9, 1988 |
| Sahara et al. | 4,805,014 | Feb. 4, 1989 |
| van Baardwijk et al. | 4,811,335 | March 7, 1989 |
| Ohue | 4,928,272 | May 22, 1990 |
| Graves et al. | 5,029,333 | July 2, 1991 |
| Maki | 5,124,980 | June 23, 1992 |
| Burton et al. | 5,189,673 | Feb. 23, 1993 |

Shomo discloses a system for bidirectional communication over existing CATV networks. Communications in the frequency band of 10 to 300 KHz follow the path of the 60-Hz power signal throughout the system. This allows bidirectional communications between any two points linked by the CATV network without requiring substantial modifications or additions to existing CATV system components.

Mertel discloses a data switching system in which a number of subscriber sets are connected over a broad-band transmission line to a switching center. The system handles audio and video telephone conversations, television communications, and data communications between the connected parties. Each subscriber set includes a control device connected over the subscriber line that selects a desired mode of operation.

Toriumi discloses a system for two-data communications over a CATV network using frequency division multiplexing. Each terminal unit includes a PLL that oscillates at a frequency corresponding to a channel selected. A frequency divider circuit subjects the output of the PLL circuit to frequency division to provide a carrier frequency for an upstream data signal. The central facility transmits programs and downstream data signals through a plurality of channels. Each terminal unit transmits an upstream data signal to the central facility by using an exclusive frequency corresponding to the channel selected.

Lehman et al. disclose a digital communication network architecture for providing universal information services including wide-band and narrow-band voice, data, and video communications. The proposed system appears to be an implementation of an integrated services digital network (ISDN) that is intended to supersede existing CATV networks.

Sahara et al. disclose an interface between a broadcast satellite system and a CATV network. A receiving stage receives the signal broadcast by the satellite consisting of base-band video signals and subchannel digital audio signals. Demodulators derive the video signals and digital audio signals. A first modulator modulates the main carriers of the CATV channels with the video signals, and a second modulator modulates the main carrier of a different channel with the digital audio signals in a time-division manner. The combined output of the first and second modulators is transmitted through the CATV transmission line.

Van Baardwijk et al. disclose a broadband/narrow-band switching network for use in an ISDN system combining telephony, data, and video communications.

Ohue discloses a two-way CATV system using frequency division multiplexing. A digital transmultiplexer at each junciton between the trunk line and a branch line converts the frequency division multiplex signal into time-division multiplex signals.

Graves et al. disclose a communications system for multiplexing broadband signal components, such as video channels, with multiplexed telephony signals.

Maki discloses a digital two-way communications network using T1 PCM communications over a CATV network.

Burton et al. disclose an integrated telecommunications network adapted to carry telephony signals and broad-band switched video signals. Control signals for the video signals are transmitted in the narrow-band as baseband signals, which are frequency division multiplexed with the broad-band switched video signals. The video control signals are transmitted over the same transmission lines as the broad-band video signals and do not require the installation of additional transmission lines. Control signals for subscribers are multiplexed together at a network unit and are transmitted as a channel on an optical fiber, after which the channels from a plurality of network units are further multiplexed together to form a frame of control channels that are transmitted to a central video controller.

Solution to the Problem

None of the prior art references uncovered in the search show a system for providing telephone service over a cable television system in a frequency band of approximately 5–40 MHz in which each line amplifier is equipped with a strap or bypass circuitry to enable the telephone signal to bypass the line amplifier in the event the line amplifier fails. The relatively low frequency band of the telephone signal results in lower attenuation and permits the telephone signal to travel the distance of three or four line amplifier spacings without amplification. This distance is sufficient to cover the coaxial cable branches of most CATV systems having a fiber optic trunk between the headend and each ONU. This feature greatly enhances the reliability of telephone service provided over the CATV system.

SUMMARY OF THE INVENTION

This invention provides a system for two-way telephone communications over a cable television (CATV) system. Telephone communications are carried in a subsplit band below the video signal, preferably in the range of approximately 5–40 MHz. Each line amplifier in the coaxial cable network is equipped with a bypass strap or bypass circuitry to maintain a signal path through the line amplifier for the telephone signal in the event of failure of the line amplifier. Due to the decreased attenuation resulting from its lower frequency, the telephone signal can typically travel the distance of three or four line amplifier spacings without amplification. Line amplifier failure is a common occurrence in CATV networks. Therefore, a primary object of the present invention is to greatly increase the reliability of telephone communications over CATV networks.

Another object of the present invention is to provide a system for telephone service over CATV networks that can be readily implemented by retrofitting existing line amplifiers.

Yet another object of the present invention is to provide a system for telephone service over CATV networks without reducing the number of cable television channels that can be distributed.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 5:
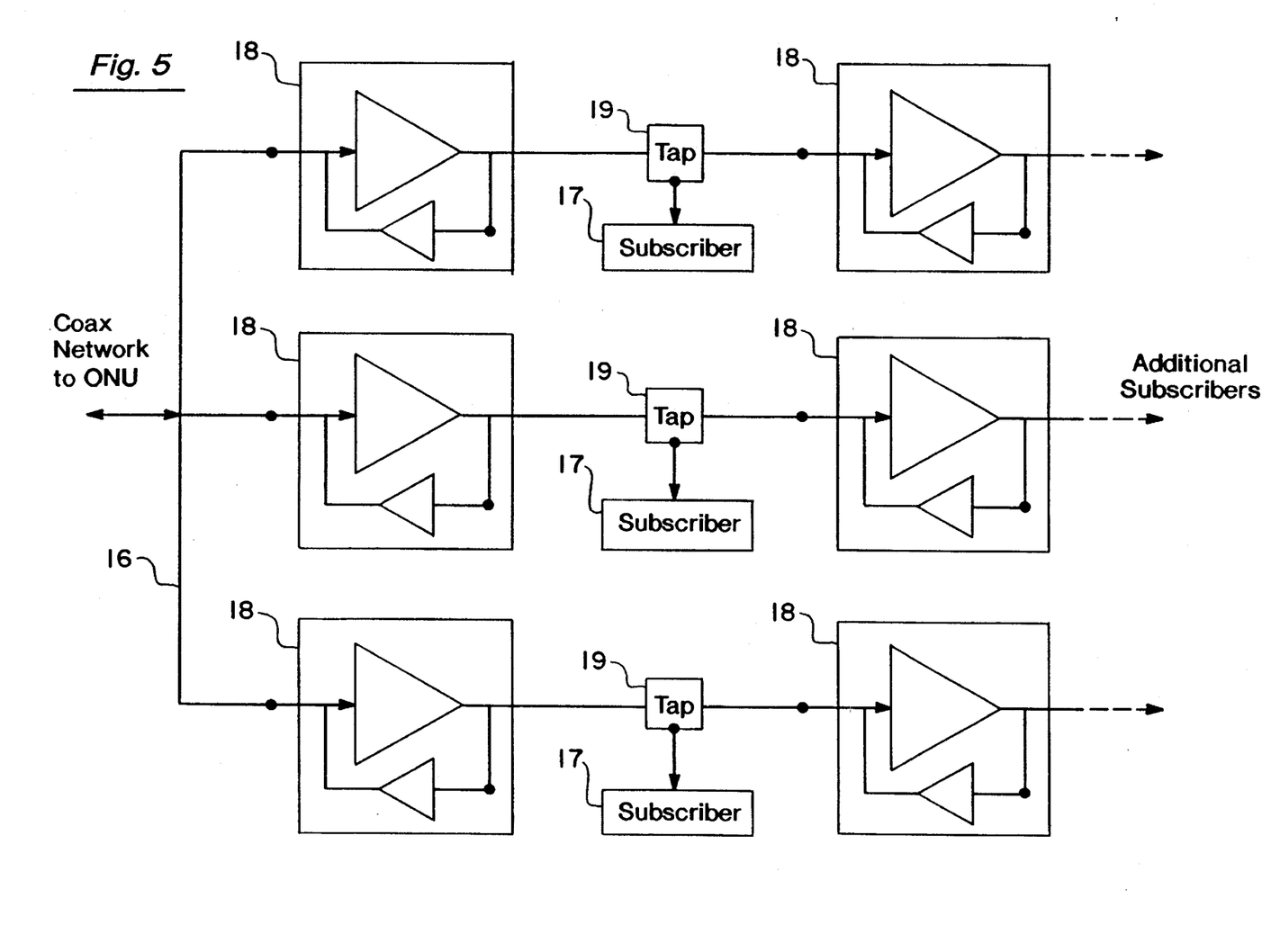
FIG. 5 is a block diagram of the coaxial cable distribution network downstream from an ONU.

Turning to FIG. 1, an overall block diagram is provided of a conventional tree-structured cable television (CATV) system for distribution of video signals. The video signals are distributed downstream from the headend 10 over fiber optics 12 to a plurality of optical network units (ONU's) 15. At each ONU 15 in a conventional CATV system, the video signal is further distributed over a plurality of coaxial cables 16 extending to a plurality of taps 19 connected to subscriber units 17. FIG. 5 is a block diagram of the coaxial cable distribution network downstream from an ONU 15. The coaxial cable 16 from each ONU 15 generally has a tree structure with a number of branches. Line amplifiers 18 are located at intervals along the coaxial cable network 16 downstream from each ONU 15 to boost the signal. Assuming the CATV system supports interactive services, each line amplifier 18 typically includes separate amplifiers for downstream and upstream signal paths.

Figure 2:
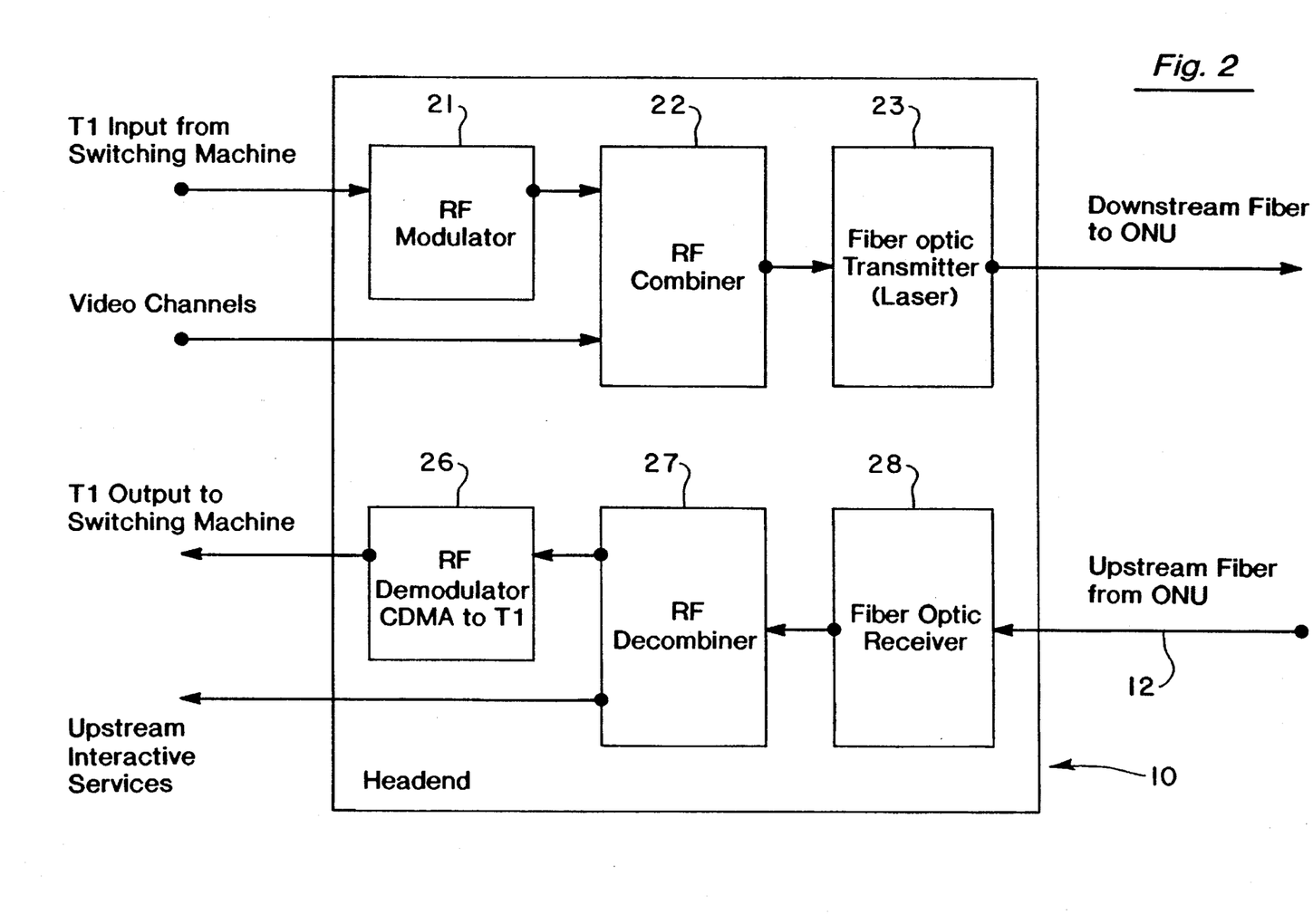
FIG. 2 is a block diagram of the headend equipment 10.

The present invention adapts and extends this conventional CATV system structure to provide two-way telephone communications as well as distribution of video signals. FIG. 2 is a simplified block diagram of the headend 10 as modified in the present system. The video signals to be distributed over the CATV system are supplied by conventional TV programming sources and converted to the appropriate frequency bands for reception by subscriber televisions sets (i.e., approximately 54 MHz to 600 MHz). The headend 10 also interfaces with external telephone switching equipment (e.g., a local telephone operating company central office or switch) to provide telephone service to the CATV system's subscribers. In the preferred embodiment, the switch transmits and receives telephone signals with the headend 10 using the conventional T 1 format that is widely used in the United States. However, it should be expressly understood that any number of alternative formats are widely known in the telecommunications industry and could be substituted to carry telephone communications in the present invention.

The telephone signal to be communicated downstream to subscribers is first modulated by a radio frequency modulator 21 to a predetermined frequency band below that of the video signal (i.e., less than approximately 54 MHz). In one embodiment, the frequency band of the telephone signal is between 5 MHz and 40 MHz. For example, the downstream telephone signal can be transmitted in a first 6-MHz band and the upstream telephone signals from the subscriber units 17 to the headend 10 can be transmitted in a second 6-MHz band, both between 5 and 40 MHz. A separation of at least 6 MHz should be maintained between the upstream telephone signal and the downstream telephone signal to minimize cross-talk.

Returning to the downstream path of the headend 10 as shown in FIG. 2, the modulated telephone signal is combined with the video signal by a radio frequency combiner 22 and then converted into an optical signal by a fiber optic transmitter 23 (e.g., a laser) so that it can be transmitted through fiber optics 12 to each ONU 15. The upstream path through the headend 10 receives the telephone signals and other interactive service signals that are transmitted upstream by the ONU's 15 over the fiber optics 12. These optical signals are first converted to corresponding electrical signals by a fiber optic receiver 28. An RF decombiner 27 then separates the upstream telephone signal from other interactive service signals. For example, this can be accomplished by band-pass filtering of the upstream signal. The upstream interactive services signal is passed to an external control system for conventional handling. The upstream telephone signal is demodulated by an RF demodulator 26. If the upstream telephone signal has been encoded by the subscriber units 17 using a code division multiple access (CDMA) scheme, the RF demodulator also decodes the upstream telephone signal and converts it to T1 format to interface with the external switching equipment.

Figure 3:
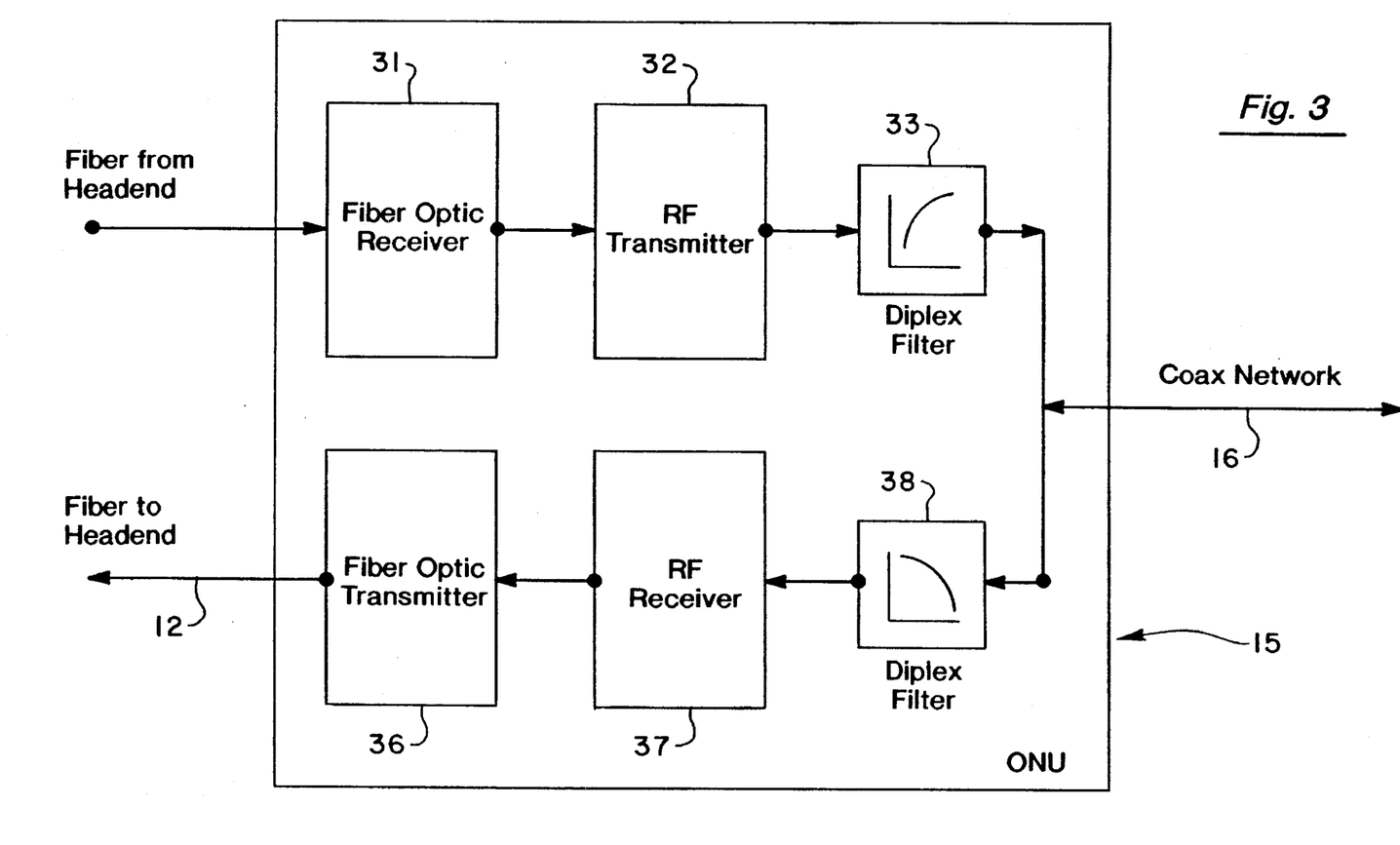
FIG. 3 is a block diagram of an optical network unit (ONU) 15.

FIG. 3 is a block diagram of an ONU 15. In the ONU's downstream signal path, a fiber optic receiver 31 converts the optical signal transmitted downstream over the fiber optics 12 from the headend 10 into corresponding electrical signals. A radio frequency transmitter 32 then relays these signals downstream through the coaxial cable network 16 to the subscriber units 17. The ONU's upstream path includes a diplex filter 33, and a radio frequency receiver 37 to separate the upstream telephone signals and interactive services signals from the other signals that are present on the coaxial cable network 16. In the preferred embodiment, these upstream signals can be readily separated using a low-pass filter arrangement. The upstream signals are then converted to optical signals by a fiber optic transmitter 36 and carried over the fiber optic cable 12 to the headend 10.

It has been found that some types of laser transmitters 23 used in conventional headend equipment 10 have limited bandwidth and exhibit non-linearity and distortion problems in the 5–40 MHz band. One alternative embodiment of the present invention addresses this problem by transmitting the downstream telephone signal from the headend 10 to each ONU 15 in a frequency band immediately below the video signal (i.e., 50 to 54 MHz). In this embodiment, each ONU also includes a local oscillator and mixer to translate the downstream telephone signal to a frequency band between approximately 5 MHz and 40 MHz before it is distributed over the coaxial cable network to subscribers.

Figure 4:
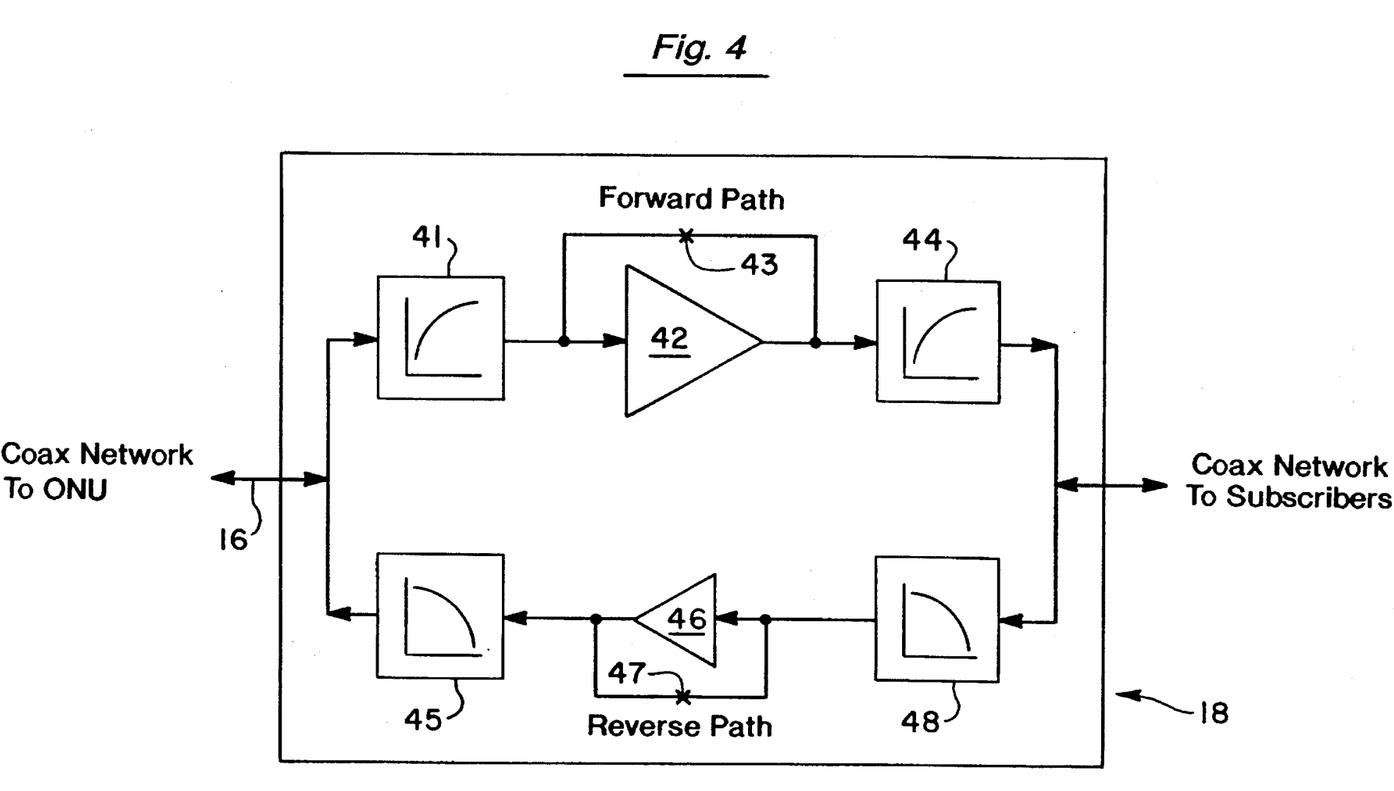
FIG. 4 is a block diagram of a line amplifier 18.

FIG. 4 is a block diagram of one of the line amplifiers 18 that are inserted at intervals in the coaxial cable network 16 to amplify both the upstream and downstream signals. Each line amplifier includes two sets of diplex filters 41, 45 and 44, 48 to separate the downstream signal path from the upstream signal path. The downstream signal path of the line amplifier 18 includes a forward amplifier 42 with a bypass strap 43 to provide a signal path around the forward amplifier in case of amplifier failure. Similarly, the upstream path includes a reverse amplifier 46 with a bypass strap 47 to provide a signal around the reverse amplifier in case of amplifier failure.

Figure 7:
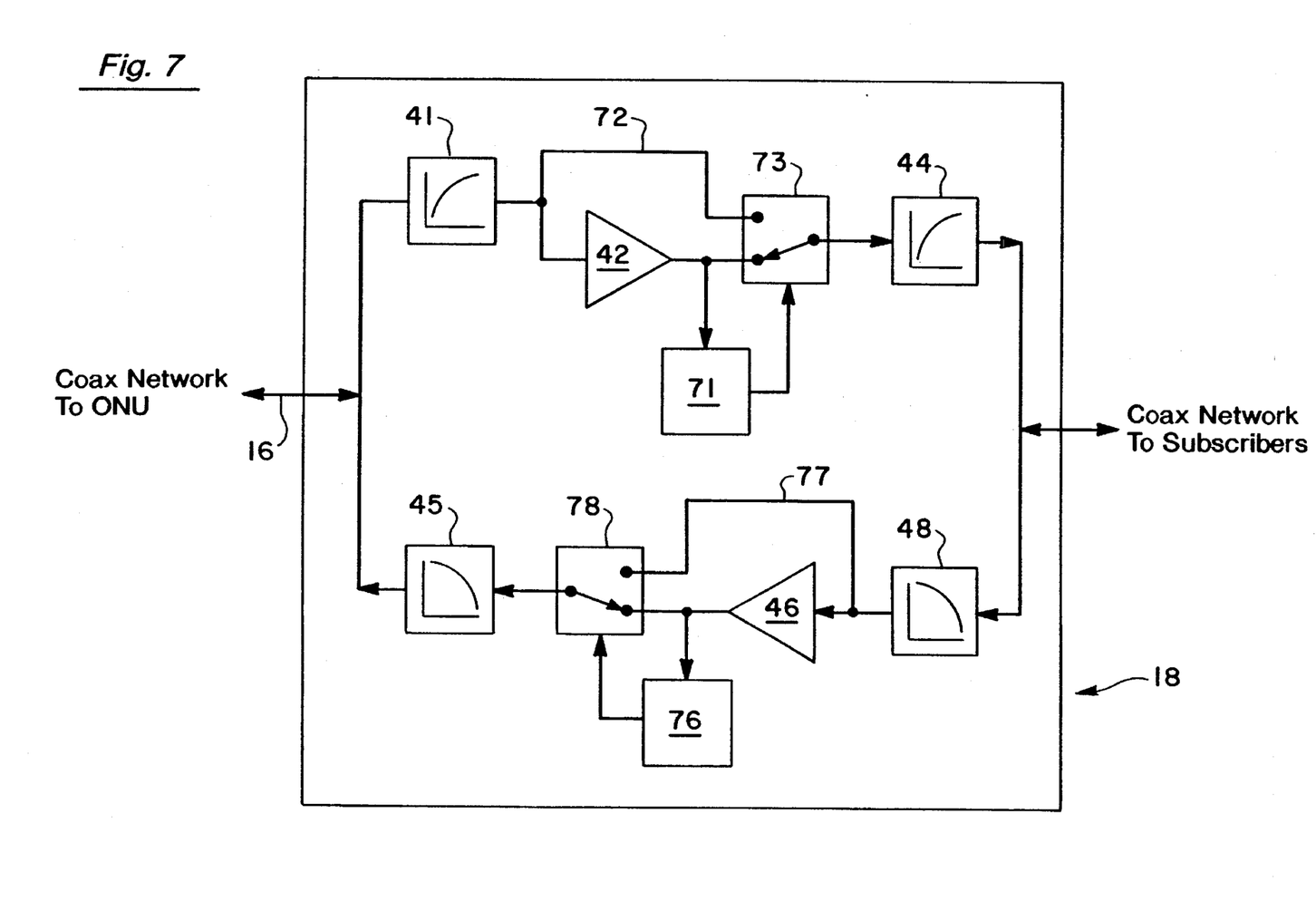
FIG. 7 is a block diagram of an alternative embodiment of a line amplifier 18 incorporating circuitry to detect loss of signal.

FIG. 7 is a block diagram of an alternative embodiment of the line amplifier 18 incorporating circuitry to detect loss of signal by either the forward or reverse amplifiers 42 or 46. The configuration of the line amplifier 18 is otherwise generally similar to that shown previously in FIG. 4. In particular, the output of the forward amplifier 42 is monitored by a signal detection circuit 71. While the forward amplifier is operating normally, the signal detection circuit 71 controls a switch or relay 73 to connect the output of the forward amplifier 42 to the downstream signal path for the line amplifier 18. However, if the output of the forward amplifier 42 falls below a predetermined minimal value, the signal detection circuit 71 actuates the switch 73 to select the bypass line 72 around the forward amplifier 42. A similar signal detection circuit 76 and switch 78 are employed in the upstream signal path for selecting either the output of the reverse amplifier 46 or the bypass line 77 around the reverse amplifier.

Figure 6:
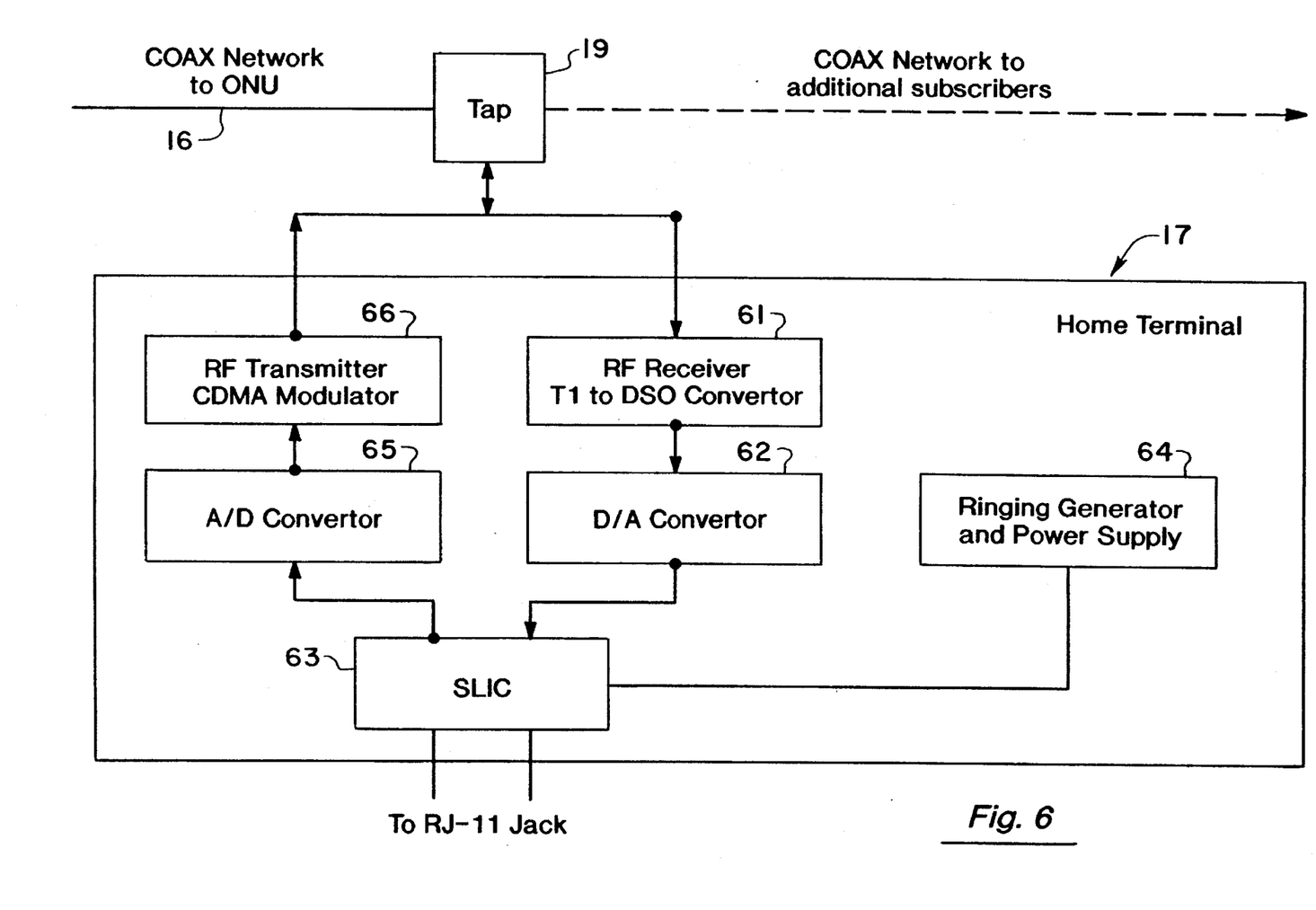
FIG. 6 is a block diagram of a subcriber terminal unit 17.

FIG. 6 is a block diagram of a subscriber unit 17 connected by a conventional tap 19 to the coaxial cable network 16. A radio frequency receiver 61 receives the downstream telephone signal and converts it to T1 format. The RF receiver 61 also extracts the digital data from the assigned channel for the conversation within each T1 frame and converts this data to DS0 format. A digital-to-analog convertor 62 converts this digital data to an analog signal that can be fed through a subscriber line interface circuit (SLIC) 63 and an RJ-11 jack to a standard telephone. Control signals (e.g., for ringing) are also communicated downstream as part of the T1 communications protocol. These are used to actuate the ringing generator 64 when needed.

In the upstream signal path for the subscriber unit 17, an ND convertor 65 converts the analog signal from the subscriber's telephone into digital form. This data is then modulated by an RF transmitter 66 into a predetermined frequency band below the video signal (i.e., less than approximately 54 MHz). As previously discussed, the upstream telephone signal is carried in a second frequency band between approximately 5–40 MHz in the preferred embodiment of the present invention. In addition, the upstream telephone data can be encoded using a code division multiple access (CDMA) scheme to minimize interference between subscribers. This is similar to CDMA schemes used in some types of cellular telephone systems to allow multiple users to share common frequency bands. A unique binary key is assigned to each subscriber. Alternatively, time division multiple access (TDMA) or frequency division multiple access (FDMA) schemes could be substituted. It is also possible to combine CDMA, FDMA, and/or TDMA schemes to provide greater capacity in a limited frequency band.

The above disclosure sets forth a number of embodiments of the present invention. Other arrangements or embodiments, not precisely set forth, could be practiced under the teachings of the present invention and as set forth in the following claims.

We claim:

1. In a cable television (CATV) system for distribution of a video signal and for two-way telephone communications, having a headend, a plurality of optical network units (ONU's) connected to said headend by fiber optics, a plurality of coaxial cables extending from each ONU to a plurality of subscriber units, and a number of line amplifiers located at intervals along said coaxial cables between said ONU's and said subscriber units, the improvement comprising:

said headend having a downstream path for distribution of video and telephone signals to said ONU's and an upstream path for receiving telephone signals from said ONU's, said headend downstream path including:

(a) means for modulating said downstream telephone signal to a first frequency band below said video signal;

(b) means for combining said modulated downstream telephone signal with said video signal; and (c) means for transmitting said combined telephone and video signals over said fiber optics to said ONU's;

said ONU's having a downstream path for distribution of said combined telephone and video signals from said headend to said subscriber units and an upstream path for relaying telephone signals from said subscriber units to said headend;

said subscriber units having:

(a) means for receiving said downstream telephone signal transmitted by said ONU's;

(b) means for modulating said upstream telephone signal to a second frequency band below said video signal; and (c) means for transmitting said modulated upstream telephone signal over said coaxial cable to said ONU's; and said line amplifiers having means for maintaining a signal path through said line amplifiers for said telephone signals in the event of failure of said line amplifiers.

2. The CATV system of claim 1, wherein said first and second frequency bands are below 54 MHz.

3. The CATV system of claim 1, wherein said first and second frequency bands are in the range of 5 to 40 MHz.

4. The CATV system of claim 1, wherein first and second frequency bands are separated by at least 6 MHz.

5. The CATV system of claim 1, wherein said means for maintaining a signal path through said line amplifiers comprises a bypass strap.

6. The CATV system of claim 1, wherein said means for maintaining a signal path through each of said line amplifier comprises:

signal detector means for monitoring the output signal of said line amplifier; and bypass means controlled by said signal detector means for switchably providing a signal path around said line amplifier if the output signal of said line amplifier falls below a predetermined threshold.

7. The CATV system of claim 1, wherein said downstream telephone signal is communicated in a frequency band of approximately 50 to 54 MHz between said headend and said ONU's, and each ONU further comprises frequency conversion means for translating said downstream telephone signal to a frequency band within the range of approximately 5 to 40 MHz and transmitting said translated telephone signal to said subscriber units over said coaxial cables.

8. The CATV system of claim 1, wherein each of said upstream telephone signal from each subscriber units is encoded using a code division multiple access (CDMA) scheme.

9. The CATV system of claim 1, wherein said downstream telephone signal is received by said headend in T1 format, and said subscriber unit further comprises means for extracting data from a predetermined channel in each T1 frame.

10. The CATV system of claim 1, wherein said ONU's further comprises a diplex filter to separate said upstream telephone signals from said downstream telephone signal.

11. In a cable television (CATV) system for distribution of a video signal and for two-way telephone communications, having a headend, a plurality of optical network units (ONU's) connected to said headend by fiber optics, a plurality of coaxial cables extending from each ONU to a plurality of subscriber units, and a number of line amplifiers located at intervals along said coaxial cables between said ONU's and said subscriber units, the improvement comprising:

said headend having a downstream path for distribution of video and telephone signals to said ONU's and an upstream path for receiving telephone signals and other interactive service signals from said ONU's, said headend downstream path including:

(a) means for modulating said downstream telephone signal to a first frequency band below 54 MHz signal;

(b) means for combining said modulated downstream telephone signal with said video signal; and (c) means for transmitting said combined telephone and video signals over said fiber optics to said ONU's;

said headend upstream path including:

(a) means for receiving said upstream telephone signals and said interactive service signals from said ONU's;

(b) means for separating said upstream telephone signals from said interactive service signals; and (c) means for demodulating said upstream telephone signals; said ONU's having a downstream path for distribution of said combined telephone and video signals from said headend to said subscriber units and an upstream path for relaying said telephone signals and interactive service signals from said subscriber units to said headend;

said subscriber units having:

(a) means for receiving said downstream telephone signal transmitted by said ONU's;

(b) means for modulating an upstream telephone signal to a second frequency band below said video signal; and (c) means for transmitting said modulated upstream telephone signal over said coaxial cable to said ONU's; and said line amplifiers having:

(a) a downstream amplifier for amplifying said combined downstream telephone and video signals;

(b) bypass means for maintaining a signal path bypassing said downstream amplifier for said downstream telephone signals in the event of failure of said downstream amplifier:

(c) an upstream amplifier for amplifying said upstream telephone signals and said interactive service signals; and (d) bypass means for maintaining a signal path bypassing said upstream amplifier for said upstream telephone signals in the event of failure of said upstream amplifier.

12. The CATV system of claim 11, wherein said bypass means comprise a bypass strap.

13. The CATV system of claim 11, wherein said bypass means for maintaining a signal path through said line amplifier comprise:

signal detector means for monitoring the output signal of said line amplifier; and bypass means controlled by said signal detector means for switchably providing a signal path around said line amplifier if the output signal of said line amplifier falls below a predetermined threshold.

14. The CATV system of claim 11, wherein said first and second frequency bands are in the range of 5 to 40 MHz.

15. The CATV system of claim 11, wherein said first and second frequency bands are separated by at least 6 MHz.

16. The CATV system of claim 11, wherein said downstream telephone signal is communicated in a frequency band of approximately 50 to 54 MHz between said headend and said ONU's, and each ONU further comprises frequency conversion means for translating said downstream telephone signal to a frequency band within the range of approximately 5 to 40 MHz and transmitting said translated telephone signal to said subscriber units over said coaxial cables.

17. The CATV system of claim 11, wherein said upstream telephone signal from each of said subscriber units is encoded using a code division multiple access (CDMA) scheme.

18. The CATV system of claim 17, wherein said upstream path of said headend further comprises means for decoding said CDMA-encoded telephone signals from said subscriber units and converting said telephone signals to T1 format.

19. In a cable television (CATV) system for distribution of a video signal and for two-way telephone communications, having a headend, a plurality of optical network units (ONU's) connected to said headend by fiber optics, a plurality of coaxial cables extending from each ONU to a plurality of subscriber units, and a number of line amplifiers located at intervals along said coaxial cables between said ONU's and said subscriber units, the improvement comprising:

said headend having a downstream path for distribution of video and T1 telephone signals to said ONU's and an upstream path for receiving code division multiple access (CDMA) encoded telephone signals and other interactive service signals from said subscriber units through said ONU's, said headend downstream path including:

(a) means for modulating said downstream telephone signal in T1 format to a first frequency band below 54 MHz signal;

(b) means for combining said modulated downstream telephone signal with said video signal; and (c) means for transmitting said combined telephone and video signals over said fiber optics to said ONU's;

said headend upstream path including:

(a) means for receiving said upstream CDMA-encoded telephone signals and said interactive service signals from said ONU's;

(b) means for separating said upstream telephone signals from said interactive service signals;

(c) means for demodulating said upstream telephone signals; and (d) means for decoding and converting said demodulated upstream telephone signals to T1 format;

said ONU's having a downstream path for distribution of said combined telephone and video signals from said headend to said subscriber units and an upstream path for relaying said telephone signals and interactive service signals from said subscriber units to said headend;

said subscriber units having:

(a) means for receiving and converting said downstream telephone signal transmitted by said ONU's from T1 format into an analog telephone signal;

(b) means for modulating an upstream telephone signal to a second frequency band below said video signal; and (c) means for encoding said modulated upstream telephone signal using a code division multiple access (CDMA) scheme and transmitting said CDMA-encoded upstream telephone signal over said coaxial cable to said ONU's; and said line amplifiers having:

(a) a downstream amplifier for amplifying said combined downstream telephone and video signals;

(b) bypass means for maintaining a signal path bypassing said downstream amplifier for said downstream telephone signals in the event of failure of said downstream amplifier;

(c) an upstream amplifier for amplifying said upstream telephone signals and said interactive service signals; and (d) bypass means for maintaining a signal path bypassing said upstream amplifier for said upstream telephone signals in the event of failure of said upstream amplifier.

20. The CATV system of claim 19, wherein said bypass means comprise a bypass strap.

21. The CATV system of claim 19, wherein said bypass means for maintaining a signal path through said line amplifier comprise:

signal detector means for monitoring the output signal of said line amplifier; and bypass means controlled by said signal detector means for switchably providing a signal path around said line amplifier if the output signal of said line amplifier falls below a predetermined threshold.

22. The CATV system of claim 19, wherein said first and second frequency bands are in the range of 5 to 40 MHz.

* * * * *